United States Patent
Galimov et al.

[11] 3,712,159
[45] Jan. 23, 1973

[54] DEVICE FOR AUTOMATIC CUT-OFF OF TOOL CARRIER FEED IN METAL-CUTTING MACHINES

[76] Inventors: Ravil Khusainovich Galimov, 9 Podlesnaya ulitsa 54, kv. 26; Alexandr Alexandrovich Modze Kevsky, ulitsa Pushkinskaya 213, kv. 30, both of Izhevsk, U.S.S.R.

[22] Filed: Dec. 3, 1970

[21] Appl. No.: 94,747

[52] U.S. Cl. .................................................82/22
[51] Int. Cl. ..........................................B23b 21/00
[58] Field of Search.................................82/22, 23

[56] References Cited

UNITED STATES PATENTS

| | | | |
|---|---|---|---|
| 2,933,001 | 4/1960 | Stege | 82/23 |
| 2,297,501 | 9/1942 | Roloff et al. | 82/22 X |
| 2,154,915 | 4/1939 | Ohera | 82/22 |

Primary Examiner—Leonidas Vlachos
Attorney—Holman & Stern

[57] ABSTRACT

A device for the automatic cut-off of a tool carrier feed in metal-cutting machines and particularly thread cutting and turret lathes in which a worm gear has its worm wheel linked kinematically with a mechanism for the progressive motion of the tool carrier while the worm is freely-mounted on the shaft and connected with a coaxially installed drive gear via a two-sided coupling member having large teeth which coact with teeth provided on the end surface of the worm and smaller teeth which coact with teeth located on the face of the drive gear.

2 Claims, 3 Drawing Figures

DEVICE FOR AUTOMATIC CUT-OFF OF TOOL CARRIER FEED IN METAL-CUTTING MACHINES

BACKGROUND OF THE INVENTION

The present invention relates to the machine-tool industry and, more specifically, to a device for the automatic cut-off of tool carrier feed in a metal-cutting machine.

The invention can be used most successfully in thread-cutting and turret lathes in which an accurate stopping of the moving units, e.g. tool carriers, is of vital importance.

PRIOR ART

Widely known in the art are devices for the automatic cut-off of the tool carrier by breaking the kinematic chain of the carrier drive when the carrier engages a stop. The devices of this kind comprise a worm gear whose worm wheel is linked kinematically with a mechanism for the progressive movement of the carrier and the worm is rigidly secured on the shaft. The same shaft carries a drive gear mounted coaxially with the worm and connected with the latter by a spring-loaded two-sided coupling member provided with large teeth on one side and small teeth on the other. The large teeth of this coupling member coact with teeth located on the face surface of the drive gear while the small teeth coact with the teeth of the coupling member secured on the worm shaft.

The feed of the tool carrier in the known devices is cut off by disengaging the small teeth under load which is accomplished by limiting the travel of the two-sided coupling i.e., by incomplete disengagement of its large teeth from the teeth of the drive gear coupling member.

One of the disadvantages of the known devices for the automatic cut-off of the tool carrier feed is that such devices fail to ensure an accurate stopping of the carrier at a desired point owing to an incomplete disengagement of the large teeth of the two-sided coupling member from the teeth of the drive gear coupling member.

Another disadvantage of these devices is the recoil of the tool carrier from the stop after the feed cut-off because they have no braking devices to hold the worm disengaged. A further disadvantage of the known device resides in a large number of continuously rubbing surfaces and the relative complexity of the entire mechanism.

In addition, these devices do not ensure an automatic cut-off of the tool carrier feed when rotation of the drive gear is reversed.

An object of the present invention resides in eliminating the aforesaid disadvantages.

A specific object of the invention consists in providing a device for the automatic cut-off of a tool carrier feed which ensures an accurate stopping of the carrier at a preset point without load on the coupling member teeth, without recoil of the carrier from the stop at the end of the feed stroke, and provided with an automatic feed cut-off after the reversal of the drive gear rotation.

SUMMARY OF THE INVENTION

According to the invention, the above and other objects are accomplished by mounting the worm freely on a shaft with a provision for axial movement thereon and by directing the large teeth of a two-sided coupling member towards the worm, and its small teeth towards the drive gear, and by providing a braking device for holding the worm disengaged after releasing the coupling.

Such a design of the device ensures an accurate stopping of the tool carrier at a preset point without its recoil after the feed has been cut off.

It is practicable that the axially moving shaft be provided with a rigidly secured one-sided coupling member connecting the shaft with the worm when the drive gear rotates in one direction and disconnecting such components when rotation of the gear is reversed, with the depth of the teeth of the coupling member being greater than that of the large teeth of the two-sided coupling member.

Such an arrangement of the device allows the feed of the tool carrier to be automatically cut off when the carrier moves in both directions which is ensured by reversing the drive gear rotation.

Other objects and advantages of the invention will become apparent from the detailed description of the examples of realization of the invention and from the accompanying drawings, in which:

DETAILED DESCRIPTION OF THE DRAWINGS

Figure 1:
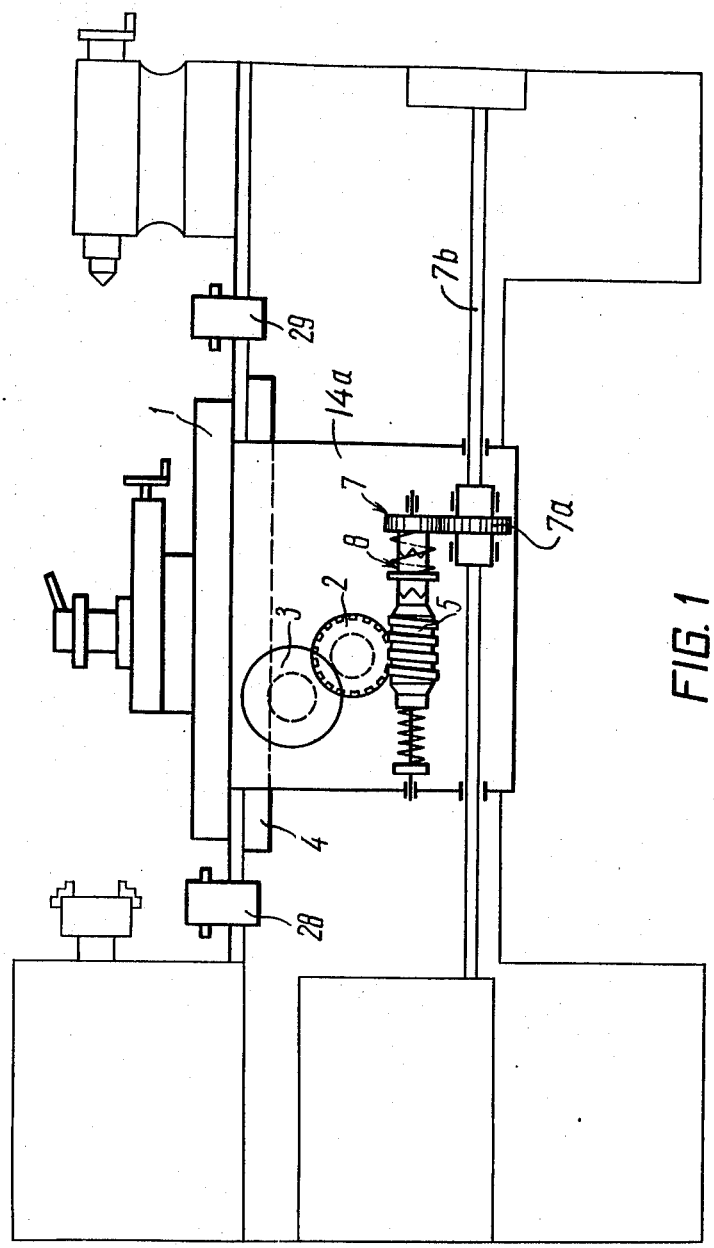
FIG. 1 is a schematic representation of a turning lathe.

The device for an automatic cut-off of the feed of a tool carrier 1 (FIG. 1) in a turning lathe comprises a worm gear having a worm 5 and a worm wheel 2, with the worm wheel being linked kinematically with the mechanism for progressive movement of the tool carrier 1. This mechanism consists of a train of gears (not shown in the drawings) connected with a pinion 3 meshing with a rack 4 and imparting progressive movement to the tool carrier 1. The worm gear is built-in an apron casing 1A suspended from the tool carrier.

Figure 2:
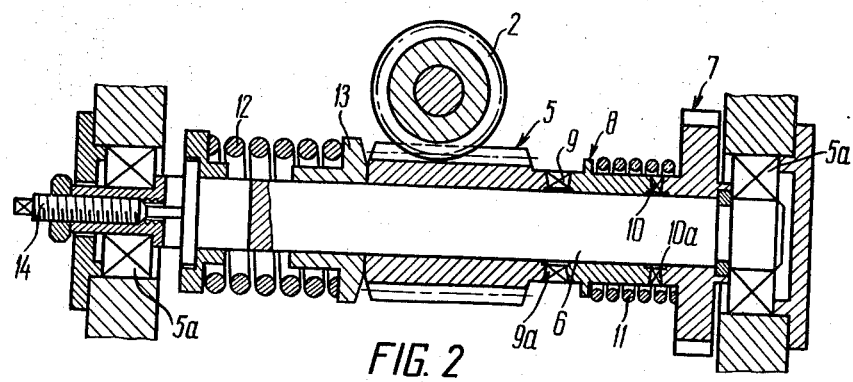
FIG. 2 is a longitudinal section through the device for the automatic cut-off of a tool carrier feed in a turning lathe.

The worm 5 (FIG. 2) of the worm gear is freely-mounted on a shaft 6 which rotates in bearings 5a and the worm can move axially with relation thereto. Freely mounted on one end of the shaft 6 is a drive gear 7 which meshes with a gear 7A on a drive shaft 7B. A two-sided coupling member 8 is installed on the shaft between the drive gear and the worm 5. The end surface of the coupling member 8 facing the worm 5 is provided with large teeth 9 preferably of triangular shape meshing with complementary teeth 9a on the end of the worm 5. The end surface of the coupling 8 facing the drive gear 7 is provided with small teeth 10 preferably of triangular shape meshing with complementary teeth 10a on the end of the drive gear 7.

Between the drive gear 7 and a stop 8a on the coupling member 8, is installed a spring 11 while at the opposite end of the shaft 6 is located a spring 12 biased between a lug on a thrust bushing 13 whose end surface coacts with the end surface of the worm 5 and a collar 12a on the shaft, respectively. The arrangement functions as a brake and holds the worm disengaged (the brake is required if the worm gear is not of the self-locking type). The tension of the spring 12 can be adjusted by proper manipulation of a screw 14.

The design of the device described above enables the tool carrier feed to be cut off automatically only in one direction of rotation of the drive gear 7.

Figure 3:
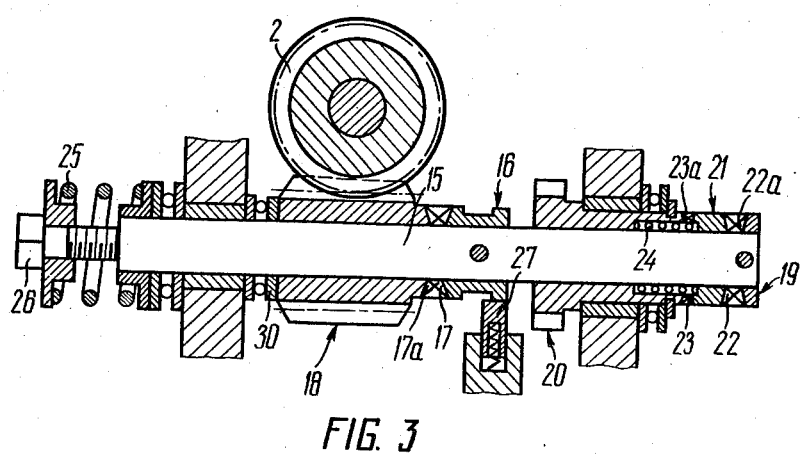
FIG. 3 is a view similar to FIG. 2 with reverse rotation of the drive gear.

The automatic feed cut-off of the tool carrier 1 moving in both directions can be ensured by reversing the rotation of the drive gear, and for which purpose there is a second form of the device illustrated in FIG. 3.

In this embodiment, a shaft 15 is installed with a provision for axial movement and carries a one-sided coupling member 16 with large teeth 17 preferably of triangular shape coacting with complementary teeth 17a on the end of a worm 18 which is freely mounted on the shaft 15. One end of the shaft 15 is provided with a coupling member 19 and a freely rotating drive gear 20. A two-sided coupling member 21 is located between the member 19 and the gear 20 and is provided with large teeth 22 preferably of triangular shape and small teeth 23 at its opposite ends, the teeth being preferably of triangular shape. The large teeth 22 of the coupling member 21 mesh with complementary teeth 22a of the coupling member 19 while its small teeth 23 coact with complementary teeth 23a on the end of the drive gear 20. A spring 24 is positioned between the two-sided coupling member 21 and the drive gear 20 and a second spring 25 is provided on the other end of the shaft 11. The spring 25 can be adjusted for compression by manipulation of a screw 26. The depth of the teeth 17 of the coupling member 16 is greater than that of the large teeth 22 of the two-sided coupling member 21.

In this form of the device, the function of the brake is effected by a spring-loaded catch 27 entering an annular recess 16a of the coupling member 16.

The device according to the first form of the invention functions as follows:

In the initial position, the large teeth 9 of the two-sided coupling member 8 are in mesh with the teeth 9a of the worm 9 while its small teeth 10 are in mesh with the teeth 10a of the drive gear 7. Hence, rotation is transmitted from the drive gear 7 via the coupling member 8 and worm 5 to the worm wheel 2 and thence, via a number of gear trains, to the pinion 3 which, through the rack 4, imparts progressive movement to the tool carrier 1.

As the tool carrier 1 engages a stop 28 (FIG. 1) secured on the machine bed, the worm wheel 2 stops but the drive gear 7 continues to rotate. As a result, the worm 5 rolling over the teeth of the worm wheel 2 will move to the left (in FIG. 2), thereby compressing the spring 12.

The teeth 9a of the worm will disengage from the large teeth 9 of the two-sided coupling member 8 which will also be moved to the left by the spring 11 so that its small teeth 10 will disengage from the teeth 10a of the drive gear 7. Thus, the kinematic chain of the device is broken without any load being applied to the small teeth and the feed of the tool carrier is automatically cut off. Under the effect of the forces of friction arising between the teeth of the worm 5 and worm wheel 2, and between the worm 5, shaft 6 and the thrust bushing 13 (serving as a brake), the worm 5 is held in the extreme left (disengaged) position.

The worm 5 is returned to the initial position by the force of the spring 12 after the kinematic chain between the pinion 3 and the worm wheel 2 is broken by a control handle (not shown in the drawings).

The device according to the second form of the invention functions is follows:

The teeth 17a of the worm 18, in the initial position, are in mesh with the teeth 17 of the coupling member 16 while the small teeth 23 of the two-sided coupling member 21 are in mesh with the teeth 23a of the drive gear 20, and the large teeth 22 of the coupling member 21 with the teeth 22a of the coupling member 19. In this case, rotation is transmitted from the drive gear 20 to the shaft 15 via the coupling members 21 and 19.

Depending on the direction of rotation of the drive gear 20, the movement is transmitted from the coupling member 16 to the worm 18 by the different sides of its teeth 17. Then, the movement is transmitted from the worm 18 to the tool carrier 1 in a manner similar to that in the device shown in FIG. 2.

When the tool carrier 1 engages the stop 28 (or 29 during the return stroke, FIG. 1), the worm wheel 2 stops and the drive gear 20 continues to rotate. Then depending on the direction of rotation of the drive gear 20, the device performs different operations.

If the drive gear 20 rotates, say, in a clockwise direction, the worm 18 will slide over the teeth of the worm wheel 2 and move to the right (in FIG. 3).

The coupling member 16, shaft 15 and the coupling member 19 will move in the same direction. The teeth 22a of the coupling member 19 will disengage from the large teeth 22 of the two-sided coupling member 21 and the spring will shift the latter out of mesh with the drive gear 20.

The kinematic chain will be broken, i.e. the feed of the tool carrier 1 will be automatically cut off.

When the drive gear 20 rotates in a counterclockwise direction, the worm 18 tends to move to the left but thrust bearing 30 (FIG. 3) limits this movement. Consequently, shaft 15 will be moved by the axial force of the teeth of the coupling members 16 and 19 to the right until the teeth 22a of the coupling member 19 disengage from the teeth 22 of the two-sided coupling member 21. Then, the coupling member 21 will moved by the spring 24 to the right, thus being forced from mesh with the drive gear 20.

As a result, the kinematic chain of the device is broken and tool carrier feed is cut off automatically. In this case the teeth 17 of the coupling member 16 do not disengage from the teeth 17a of the worm 18 because their depth is greater than that of the teeth 22a of the coupling member 19 (and, consequently, of the large teeth 22 of the coupling member 21).

The angle of the drive sides of the teeth 17 and 17a is selected so as to make the axial force on the teeth equal to that on the worm 18 which is required for equalizing the force with which the tool carrier 1 engages the stops 28 and 29, with the force of the spring 25 being the same. This ensures an identical accuracy of stopping of the tool carrier 1 regardless of the direction of its travel.

The device realized according to the second embodiment of the invention is held released (irrespective of the direction of rotation of the drive gear 20) by means of the catch 27.

The device is returned to the initial position by the operator manipulating a control handle (not shown) which releases the catch 27.

What is claimed is:

1. A device for an automatic cut-off of a tool carrier feed in metal cutting machines, comprising a tool carrier having a bed, an apron casing suspended from the tool carrier, a toothed rack rigidly secured on the tool carrier bed, a pinion meshing with the toothed rack, a worm gear unit built-in the apron casing, said worm gear unit including a shaft, a worm freely mounted on the shaft for axial movement, and a worm gear meshing with the worm, said worm gear being operably connected to said pinion, said worm being provided with end-face teeth, a drive gear freely mounted on the shaft coaxially with the worm, said drive gear being provided with small end-face teeth, a two-sided toothed coupling member freely mounted on the shaft and provided at one side with large teeth facing the worm and at the other side with small teeth facing the drive gear, spring means between said gear and coupling member, a second spring mounted on the shaft, and a braking means of non self locking type mounted on the worm gear unit between said second spring and the worm for retaining the worm in the cut-off position, when the coupling member is disengaged.

2. The device as claimed in claim 1, and including a toothed one-sided coupling member secured to said shaft and having end-face teeth, and connecting the shaft with the worm when the drive gear rotates in one direction and disconnecting the shaft and worm when the drive gear rotates in the opposite direction, the teeth of the one-sided coupling member being greater than the larger teeth of the two-sided coupling member.

* * * * *